(12) United States Patent
Maas et al.

(10) Patent No.: US 9,399,541 B2
(45) Date of Patent: Jul. 26, 2016

(54) CONTAINER WITH DEFORMABLE INNER CONTAINER AND METHOD FOR MANUFACTURE THEREOF

(71) Applicant: Dispensing Technologies B.V., DN Helmond (NL)

(72) Inventors: Wilhelmus Johannes Joseph Maas, Someren (NL); Petrus Lambertus Hurkmans, Someren (NL)

(73) Assignee: Dispensing Technologies B.V. (NL)

( * ) Notice: Subject to any disclaimer, the term of this patent is extended or adjusted under 35 U.S.C. 154(b) by 0 days.

(21) Appl. No.: 14/323,330

(22) Filed: Jul. 3, 2014

(65) Prior Publication Data

US 2015/0028030 A1    Jan. 29, 2015

Related U.S. Application Data

(63) Continuation of application No. 12/733,806, filed as application No. PCT/NL2008/000207 on Sep. 18, 2008, now Pat. No. 8,857,661.

(30) Foreign Application Priority Data

Sep. 22, 2007 (NL) ..................... 1034419
Oct. 12, 2007 (NL) ..................... 1034805

(51) Int. Cl.
*B67B 7/00* (2006.01)
*B65D 83/00* (2006.01)
(Continued)

(52) U.S. Cl.
CPC ............ *B65D 83/0055* (2013.01); *B65D 25/14* (2013.01); *B29B 11/08* (2013.01); *B29B 11/10* (2013.01); *B29B 11/14* (2013.01); *B29B 2911/1402* (2013.01); *B29B 2911/1404* (2013.01); *B29B 2911/1408* (2013.01); *B29B 2911/1412* (2013.01); *B29B 2911/1414* (2013.01); *B29B 2911/1418* (2013.01);
(Continued)

(58) Field of Classification Search
CPC .. B65D 77/065; B65D 83/0053; B65D 83/62; B65D 77/044; B65D 77/0486; B67B 7/00
USPC ........................ 428/35.7; 220/495.01–495.11; 215/11.3, 12.1–12.2; 239/323, 328; 264/510–516; 222/1, 95, 105, 386.5, 222/389, 334, 399
See application file for complete search history.

(56) References Cited

U.S. PATENT DOCUMENTS 3,223,289 A * 12/1965 Bouet ......................... 222/209
5,508,076 A * 4/1996 Bright ........................ 428/36.6
(Continued)

*Primary Examiner* — Paul R Durand
*Assistant Examiner* — Andrew P Bainbridge
(74) *Attorney, Agent, or Firm* — Kramer Levin Naftalis & Frankel LLP

(57) ABSTRACT

The invention relates to a container for a product for dispensing, comprising a relatively stiff outer container (2) having at least one dispensing opening (3), and a deformable inner container (4) to be filled with the product which is accommodated in the outer container and which likewise has a dispensing opening (5). The inner container is connected to the outer container both in the vicinity of the dispensing opening and at least at one location remote therefrom. The connection is formed in that the outer container has an opening (8) through which protrudes at least one fixing element (10) connected to the inner container. This fixing element is pin-like and has an end part of which the dimensions are larger than those of the opening. The invention further relates to a method for manufacturing such a container.

19 Claims, 13 Drawing Sheets

Figure 7:
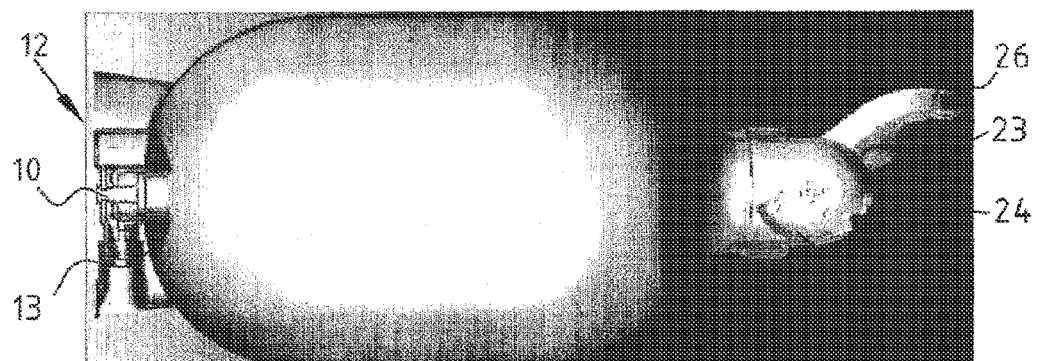

(51) Int. Cl.
*B65D 25/14* (2006.01)
*B65D 77/06* (2006.01)
*B65D 77/04* (2006.01)
*B29B 11/08* (2006.01)
*B29B 11/10* (2006.01)
*B29B 11/14* (2006.01)
*B29C 49/06* (2006.01)
*B29C 49/22* (2006.01)
*B67D 1/08* (2006.01)

(52) U.S. Cl.
CPC ......... *B29B2911/14026* (2013.01); *B29B 2911/14033* (2013.01); *B29B 2911/14053* (2013.01); *B29B 2911/14066* (2013.01); *B29B 2911/14093* (2013.01); *B29B 2911/14106* (2013.01); *B29B 2911/14113* (2013.01); *B29B 2911/14126* (2013.01); *B29B 2911/14153* (2013.01); *B29B 2911/14166* (2013.01); *B29B 2911/14326* (2013.01); *B29B 2911/14333* (2013.01); *B29B 2911/14446* (2013.01); *B29B 2911/14473* (2013.01); *B29B 2911/14486* (2013.01); *B29B 2911/14533* (2013.01); *B29C 49/06* (2013.01); *B29C 49/221* (2013.01); *B65D 77/044* (2013.01); *B65D 77/0486* (2013.01); *B65D 77/065* (2013.01); *B65D 2231/004* (2013.01); *B67B 7/00* (2013.01); *B67D 2001/0828* (2013.01); *Y10T 29/49879* (2015.01)

(56) References Cited

U.S. PATENT DOCUMENTS

| | | | | |
|---|---|---|---|---|
| 5,513,761 | A * | 5/1996 | Kobayashi et al. | 215/12.1 |
| 5,799,809 | A * | 9/1998 | Sako et al. | 215/12.1 |
| 6,270,868 | B1 * | 8/2001 | Matsui | 428/35.7 |
| 6,286,700 | B1 * | 9/2001 | Davidson | B65D 77/065 220/1.6 |
| 7,114,636 | B2 * | 10/2006 | Yoshimoto | B65D 83/0055 222/105 |
| 7,988,001 | B2 * | 8/2011 | Kuehn et al. | 215/12.2 |

* cited by examiner

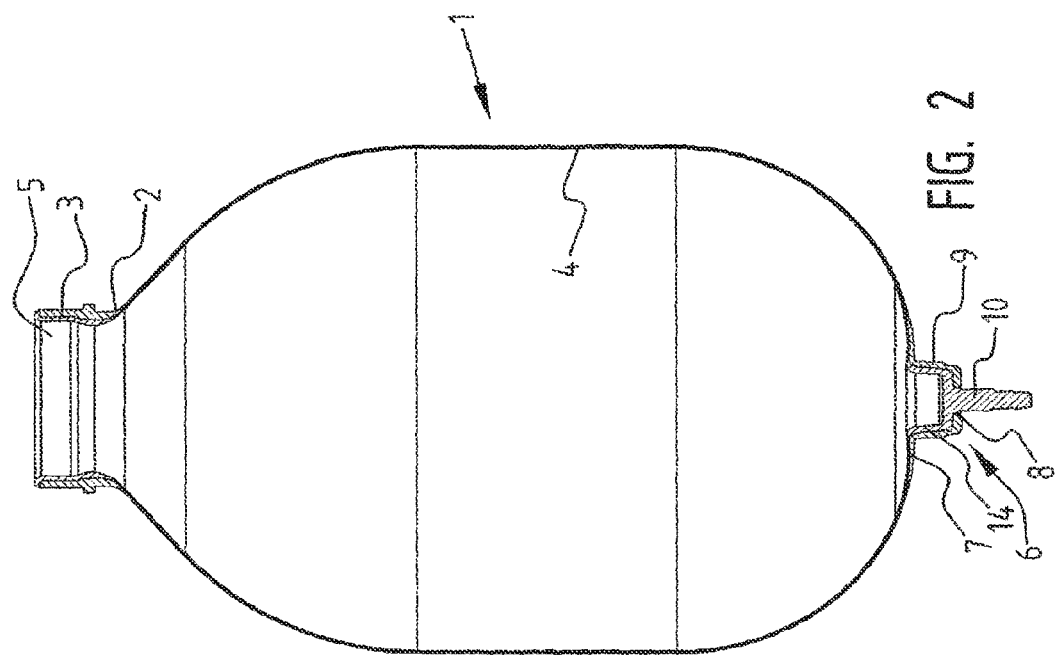
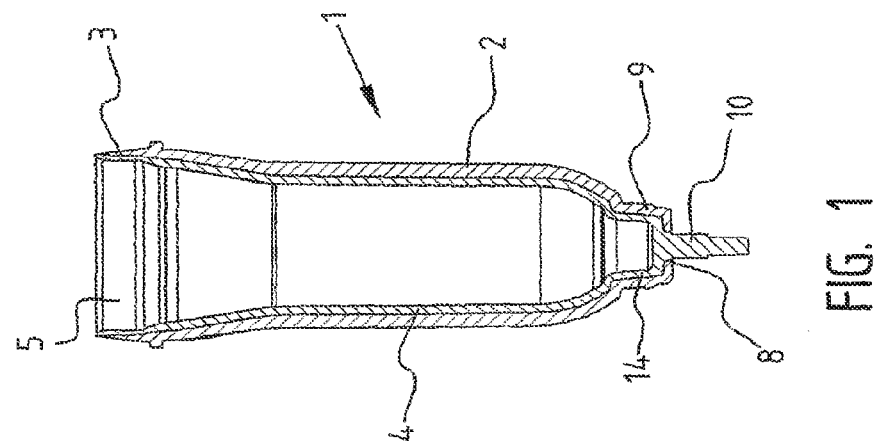

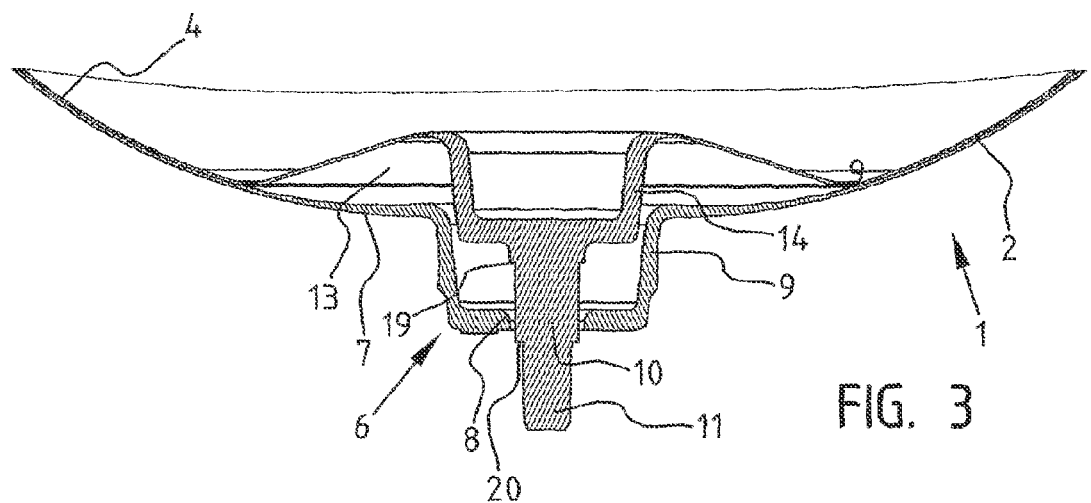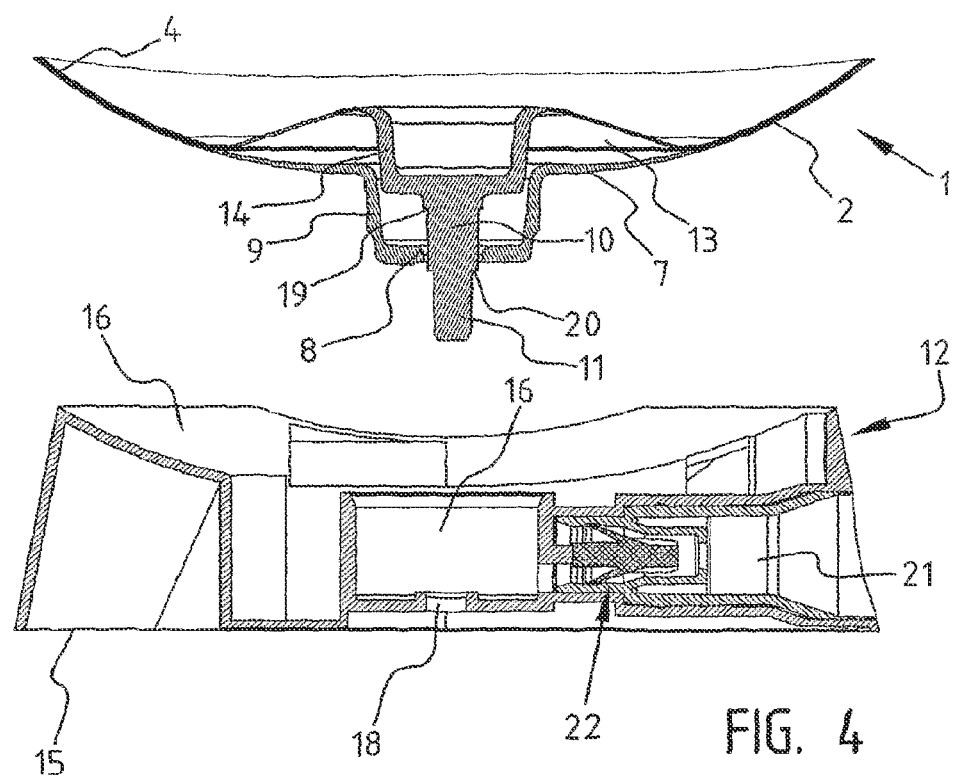

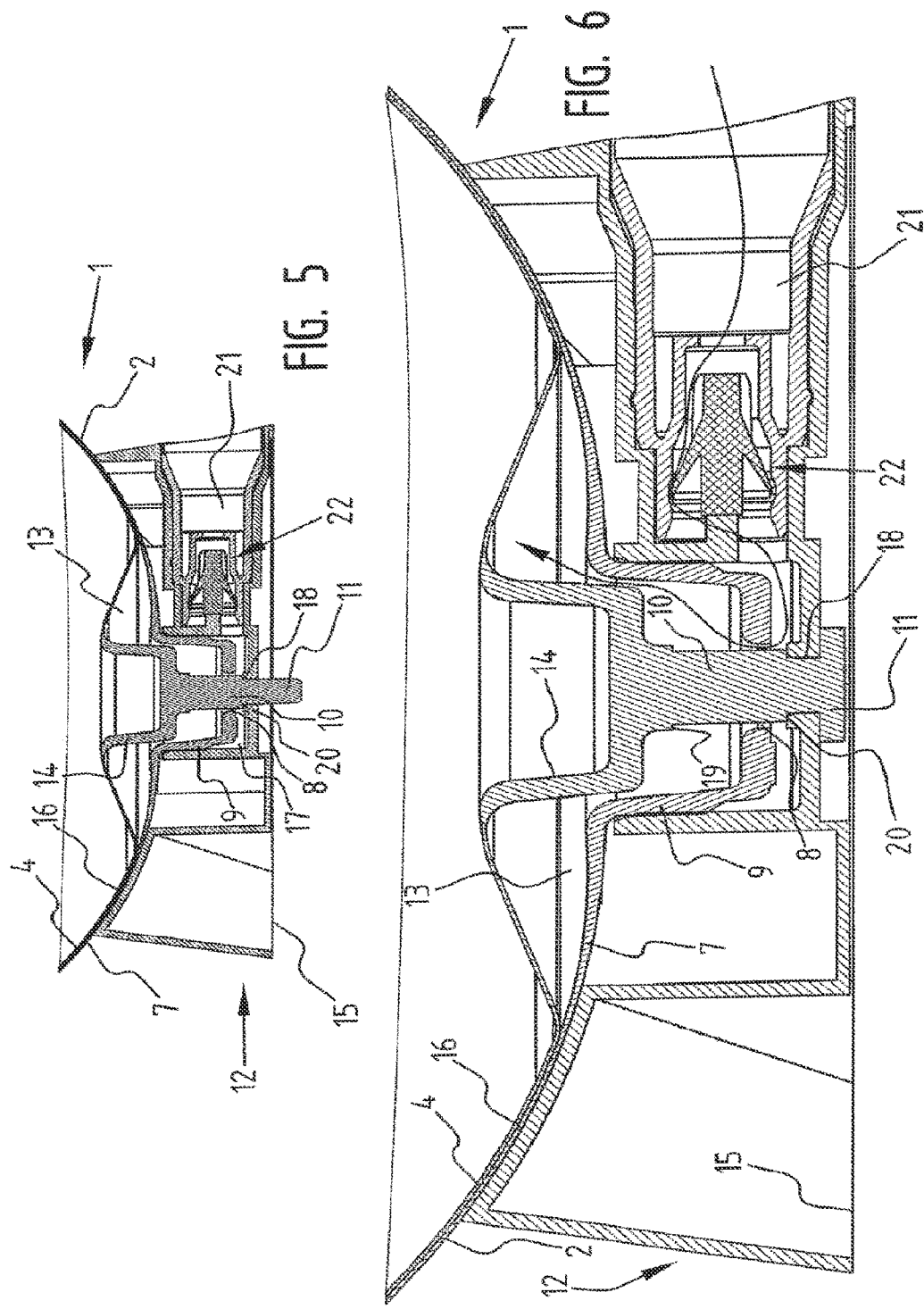

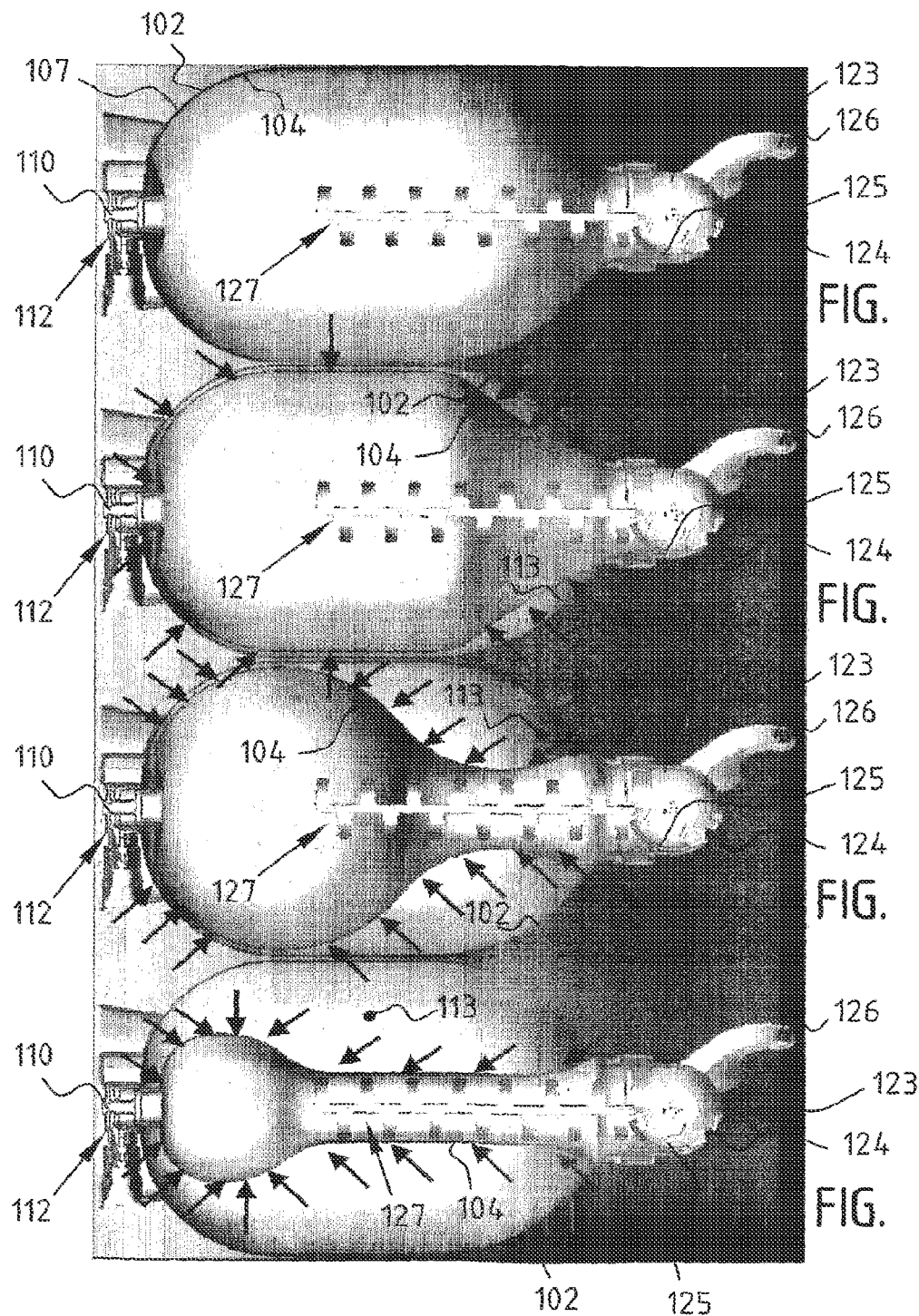

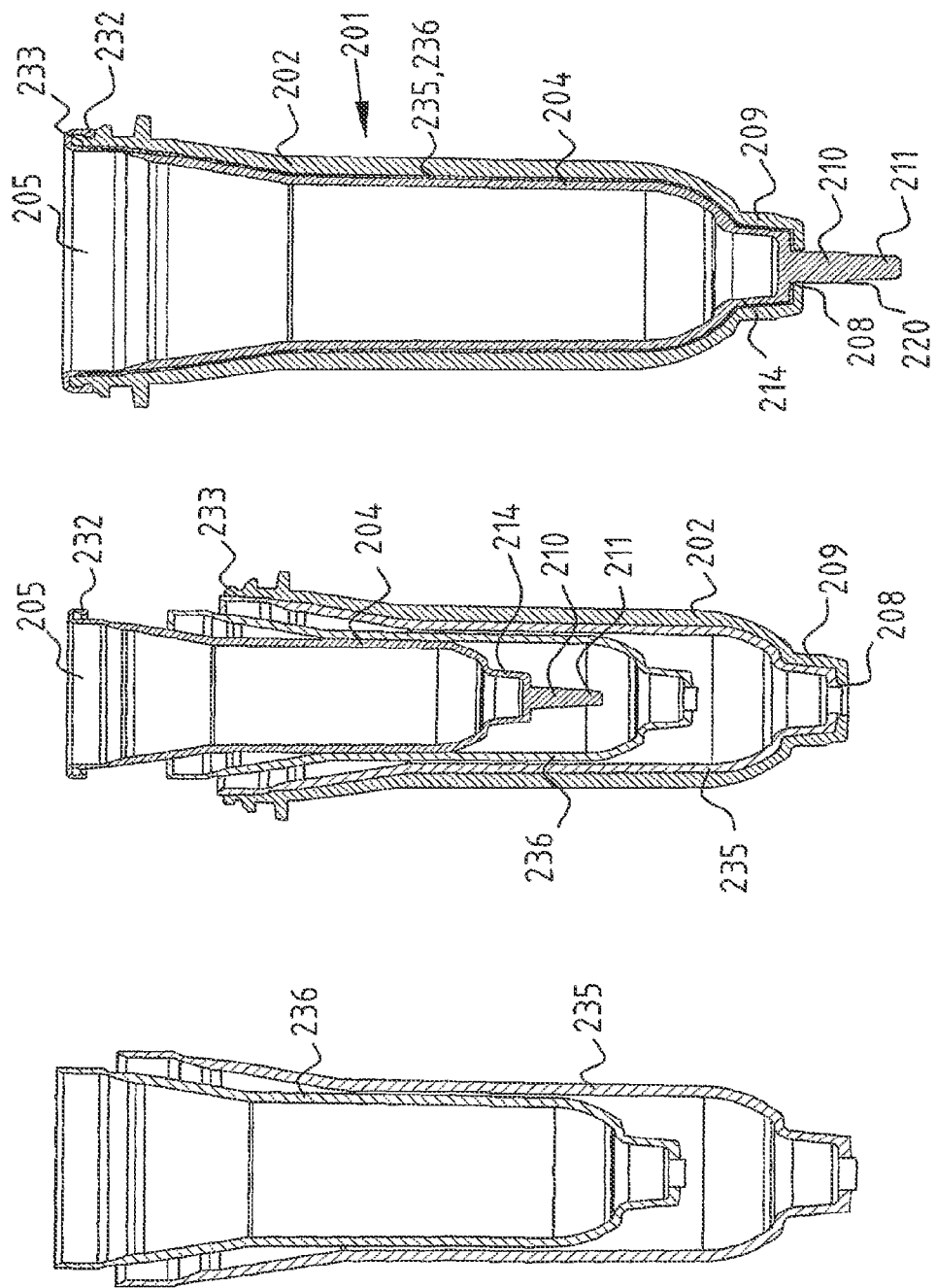

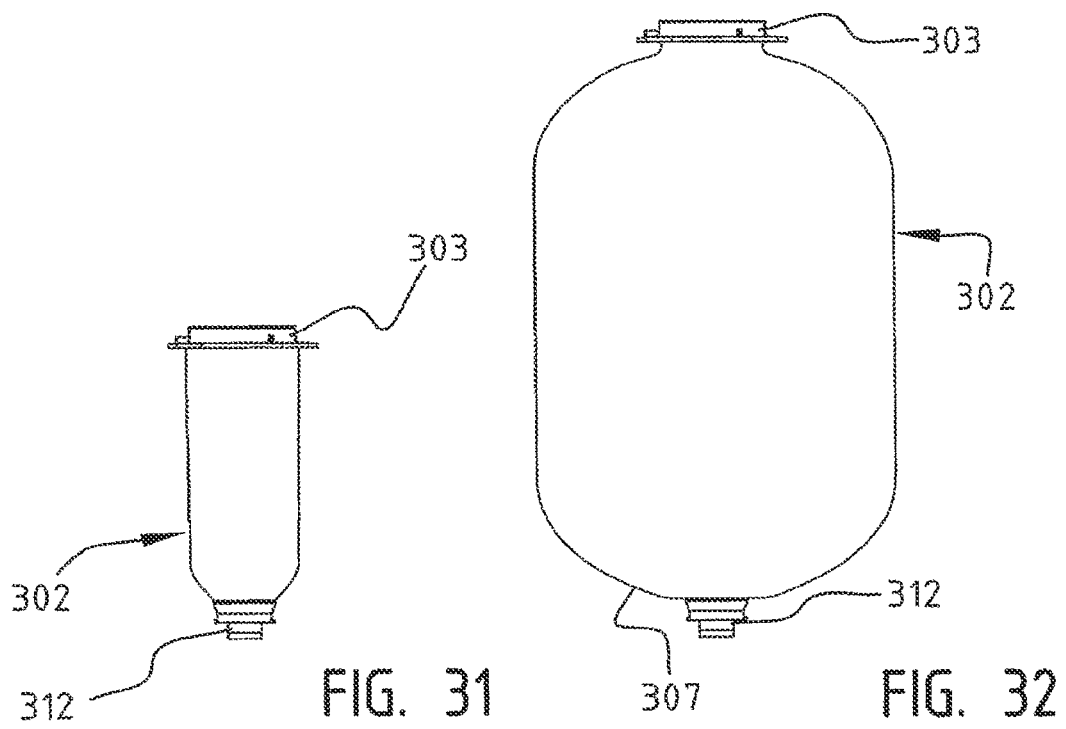
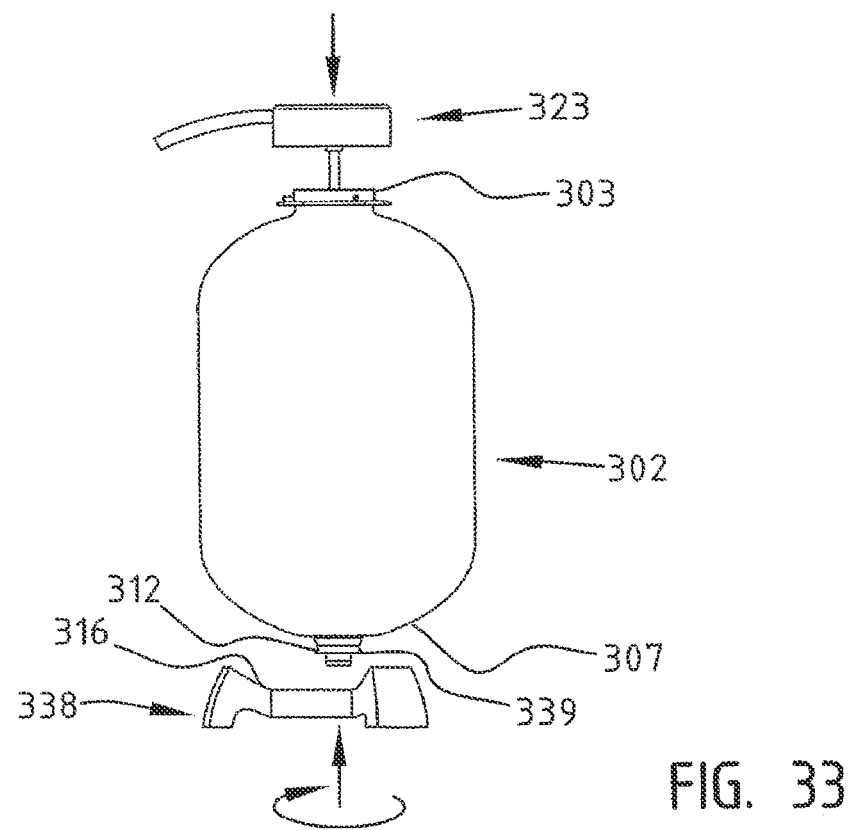

CONTAINER WITH DEFORMABLE INNER CONTAINER AND METHOD FOR MANUFACTURE THEREOF

The invention relates to a container for a product for dispensing, comprising a relatively stiff outer container having at least one dispensing opening, and a deformable inner container to be filled with the product which is accommodated in the outer container and which likewise has a dispensing opening and is connected to the outer container in the vicinity of the dispensing opening at least at one location remote from the dispensing opening. Such a container is known from US 2005/0167433 A1.

In WO 2007/039158 A1 the present applicant proposed a container, which consists of an outer container or bottle of PET and a deformable inner container or bag of for instance PP accommodated therein. This container is intended particularly for dispensing high-viscous products such as relatively thick sauces, ice-cream and the like. For this purpose this container is used in combination with a dispensing device comprising a hand pump with which a displacing medium can be forced under pressure into the space between the bottle and the bag. Such a dispensing device is described in the earlier patent application WO 2007/039167 A1 of applicant. The container is accommodated in lying position in this dispensing device, wherein the pump is connected to the space between the bottle and the bag. By operating the pump the product is then urged toward the dispensing opening of the container, after which the product can be dispensed from the container by opening a closure member.

The known container has the drawback that in practice too much product remains behind in the container. It is not possible to develop sufficient pressure with the pump to press all the product out of the inner container and thus completely empty the container. This appears to be caused by the deformation of the inner container, which as it were "crumples", forming voids bounded by folds in which the product is enclosed.

The above-identified prior art document US 2005/0167433 A1 also discloses a container which consists of a relatively stiff plastic bottle and a readily deformable plastic bag filled with the product to be dispensed, which is accommodated in the bottle. This container is intended to be emptied by means of a pump which is to be connected to its dispensing opening. In order to compensate for pressure differentials between the interior of the bottle and the surroundings when the bag is emptied by pumping, the bottle is provided with an aerating opening in its base. The bottle and the bag are preformed by co-extrusion and then placed in a blow mold. When the mold is closed a protruding seam is formed along the base, where the material of the bag is clamped between the material of the bottle. After blowing the bottle and bag into shape the joint is partially cut away and a compression force is exerted from two sides along the seam, so that one side of the bottle comes loose from the bag and the seam is locally opened. In this way the aerating opening is formed. The bag remains clamped within the part of the seam that has not been pushed open. This is a relatively complex process, which requires a great number of steps and corresponding tools.

The invention now has for its object to provide a container of the above described type wherein these problems do not occur, or at least occur to a lesser extent.

According to a first aspect of the invention, this is achieved in such a container in that the outer container has at the position of the connecting location an opening through which protrudes at least one fixing element connected to the inner container, said fixing element being pin-like and having an end part of which the dimensions are larger than those of the opening. By forming an additional connection between the inner container and the outer container the inner container is held fast some distance from the dispensing opening. Crumpling of the inner container is thus prevented and no—or in any case fewer—voids are formed in which the product is enclosed. The inner container can thus be almost completely emptied. By using a pin-like fixing element protruding through an opening and having an enlarged end part, the connection can ice effected in a swift and simple manner.

Preferred embodiments of this first variant of the invention are described in dependent claims 2 to 11.

According to a second aspect of the invention, there is provided a container of the type described in the preamble which is further provided with an elongate member which extends into the inner container from the dispensing opening and which prevents collapse of the inner container. Such an anti-collapse member is also an effective means against crumpling of the inner container. The anti-collapse member does however have to be embodied here such that it does not increase the flow resistance in the inner container too much. The presence of the anti-collapse member would otherwise itself then form an obstruction to the outflow of the product from the container.

Preferably applied variants of this second embodiment of the container according to the invention form the subject-matter of dependent claims 13 to 18.

The invention also relates to an outer container, an inner container and an anti-collapse member evidently intended for application in a container as described above.

The invention further relates to a method for forming such a container. From the above cited prior art document US 2005/0167433 A1 a method is already known comprising the steps of forming a relatively stiff outer container having at least one dispensing opening, forming a deformable inner container to be filled with the product which likewise has a dispensing opening, and arranging the inner container in the outer container and connecting the inner container and the outer container to each other in the vicinity of the dispensing openings and further at least at one location remote from the dispensing opening.

The method according to the invention is now distinguished from this known method in that the outer container is provided at the position of the connecting location with an opening through which is placed at least one pin-like fixing element connected to the inner container, and after being placed through the opening the fixing element is provided with an end part enlarged such that the dimensions thereof are larger than those of the opening.

Preferably applied variants of this method are described below and in various claims.

In addition or instead, the method according to the invention is distinguished in that an elongate member is inserted from the dispensing opening into the inner container in order to prevent collapse of the inner container.

Further variants of this method are also described and claimed.

Figure 11:
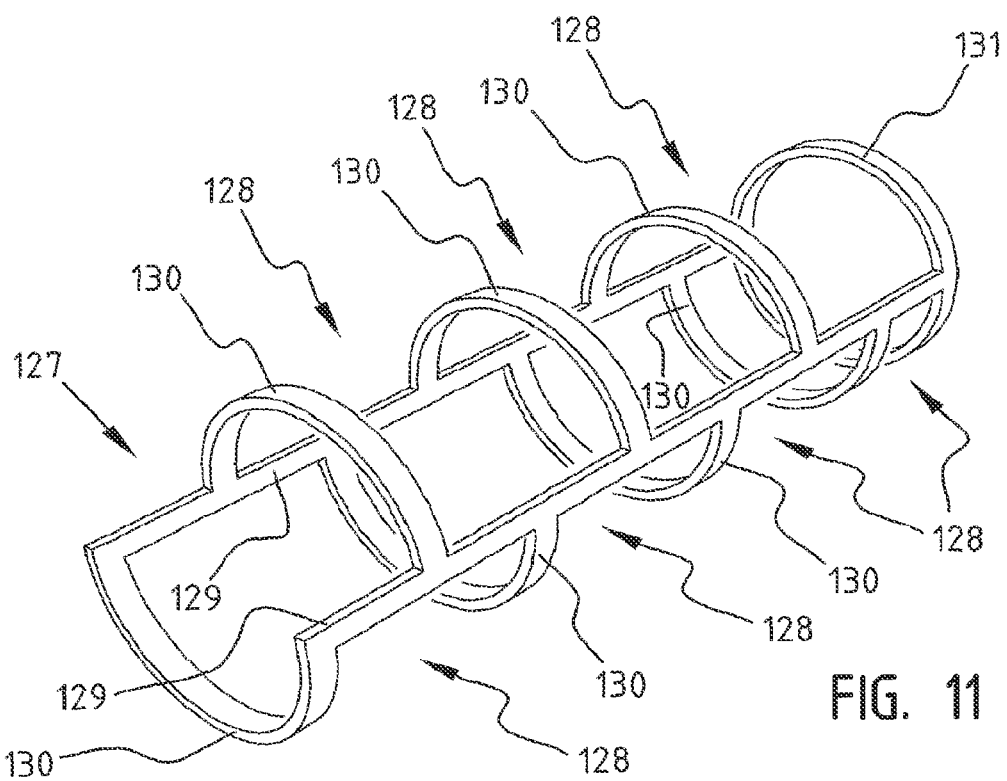
Figure 12:
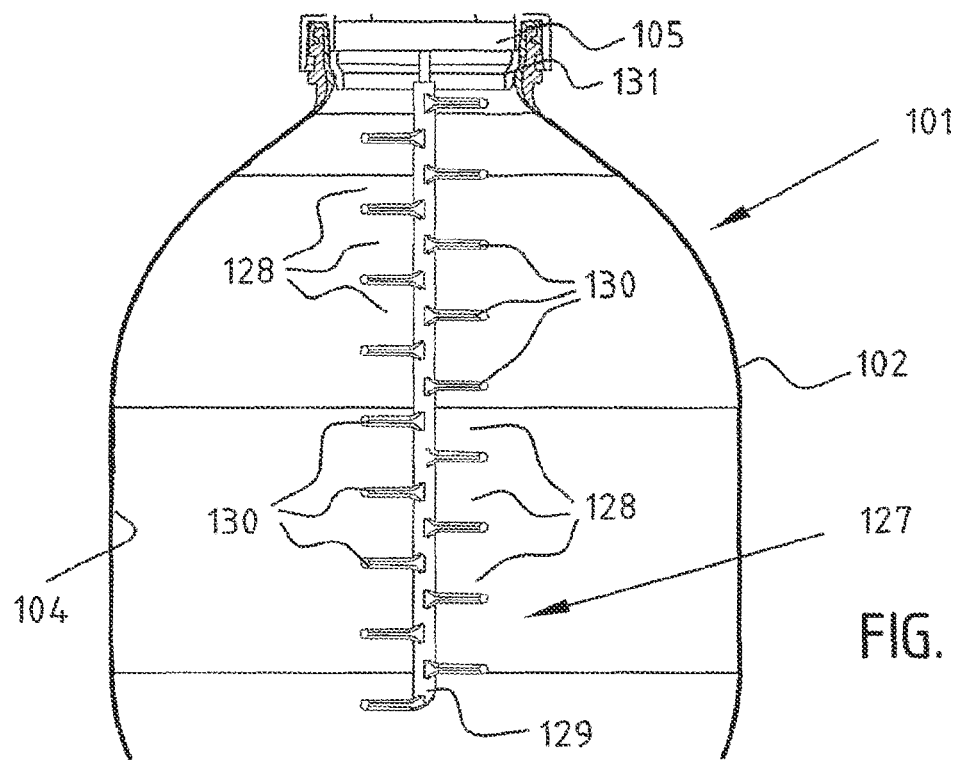
Figure 13:
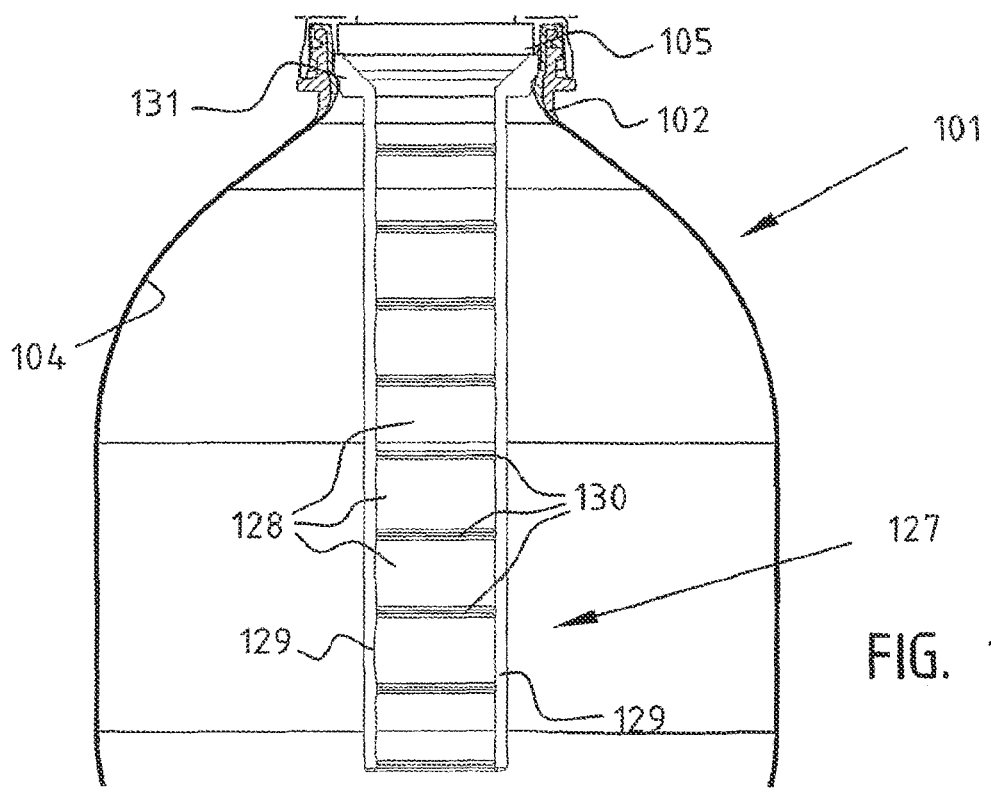
Figure 18:
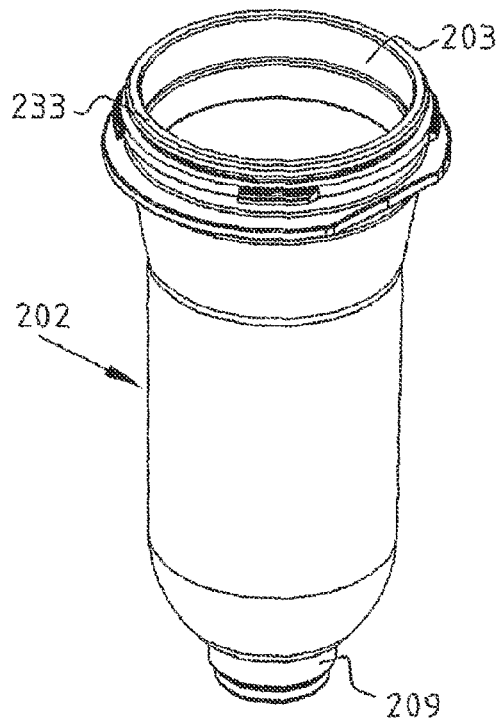
Figure 19:
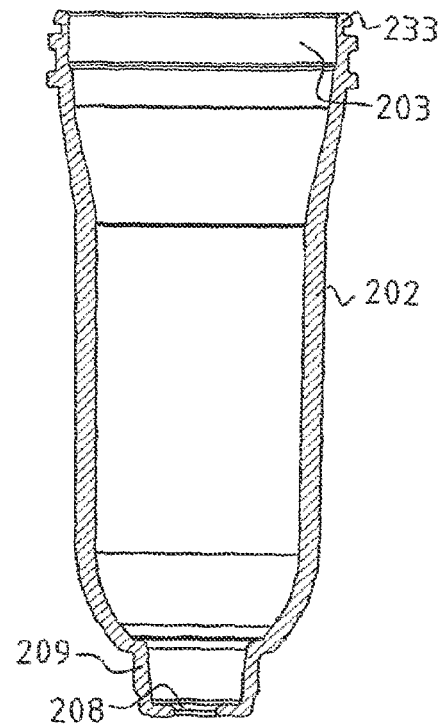
Figure 20:
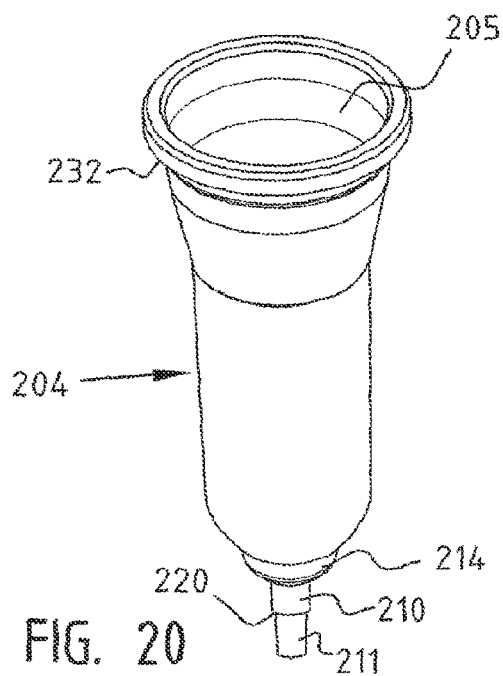
Figure 21:
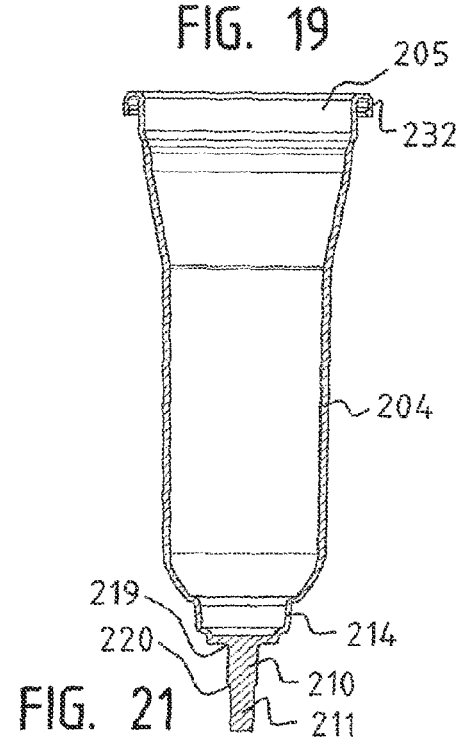
Figure 25:
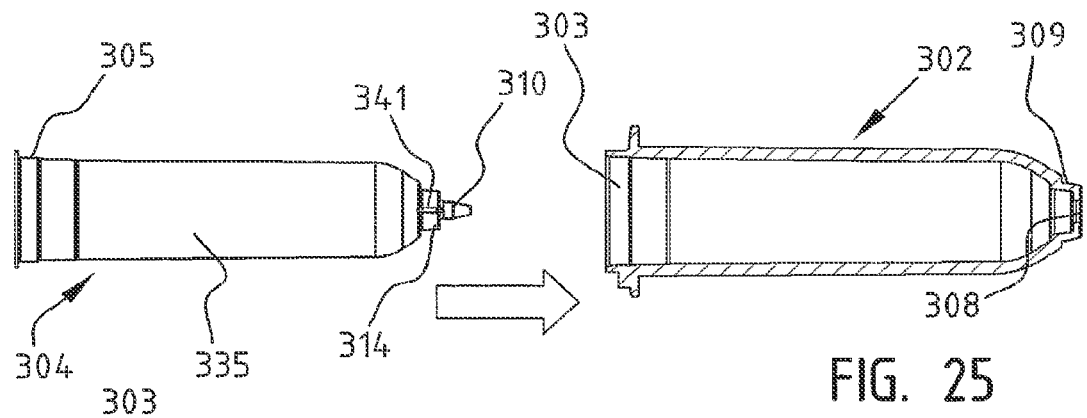
Figure 26:
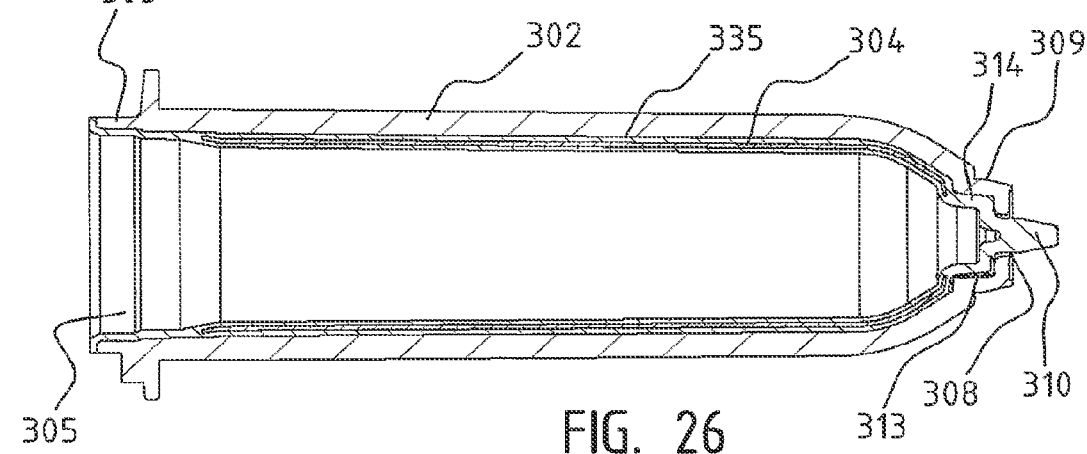
Figure 27:
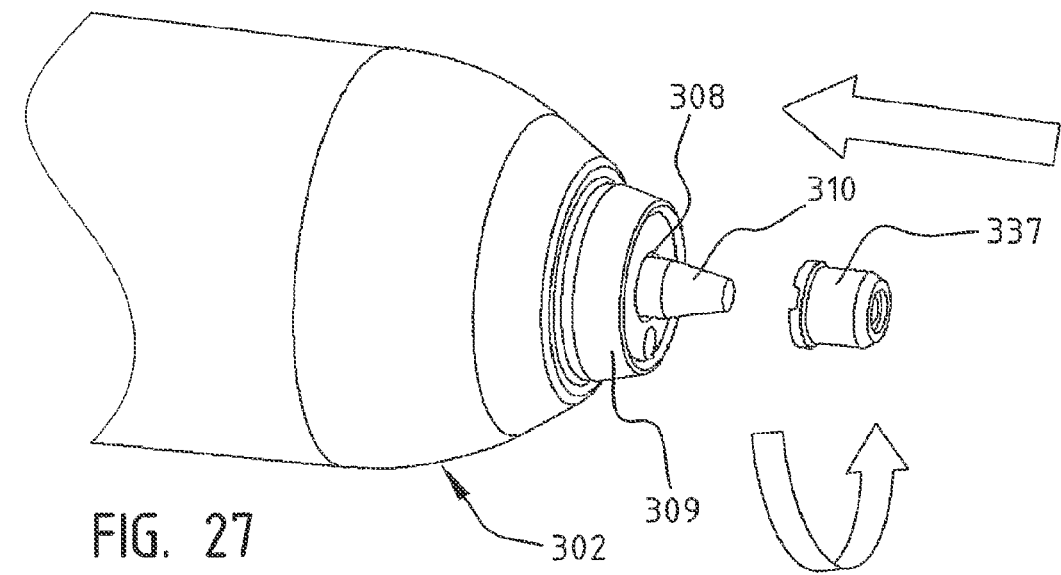
Figure 28:
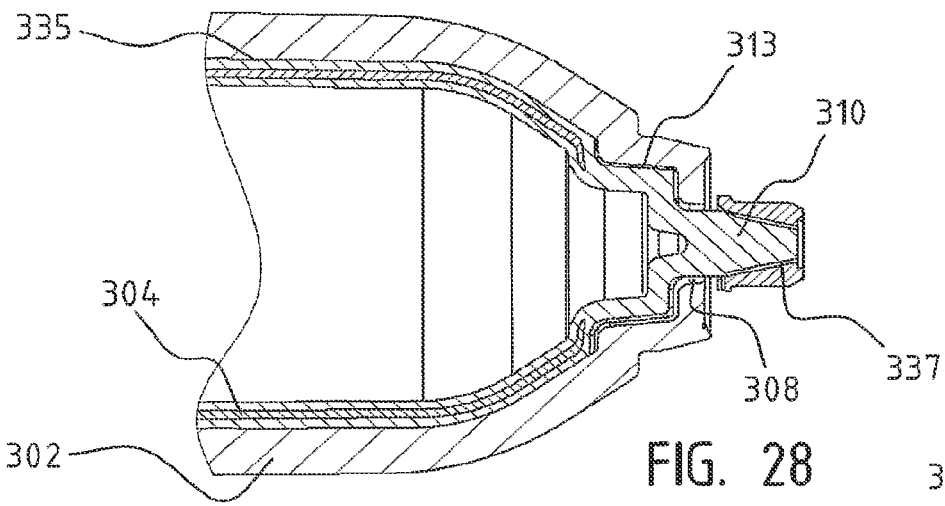
Figure 29:
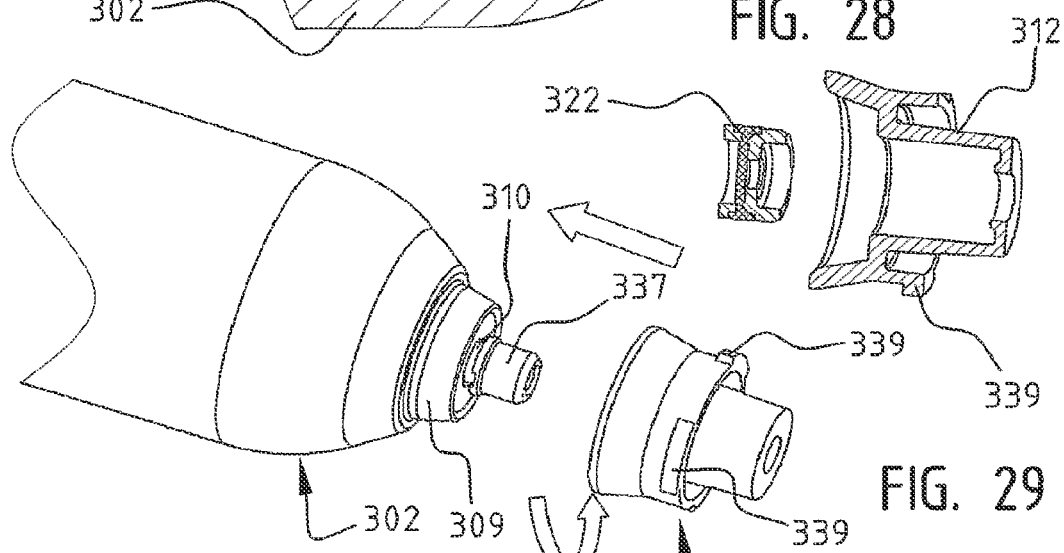
Figure 30:
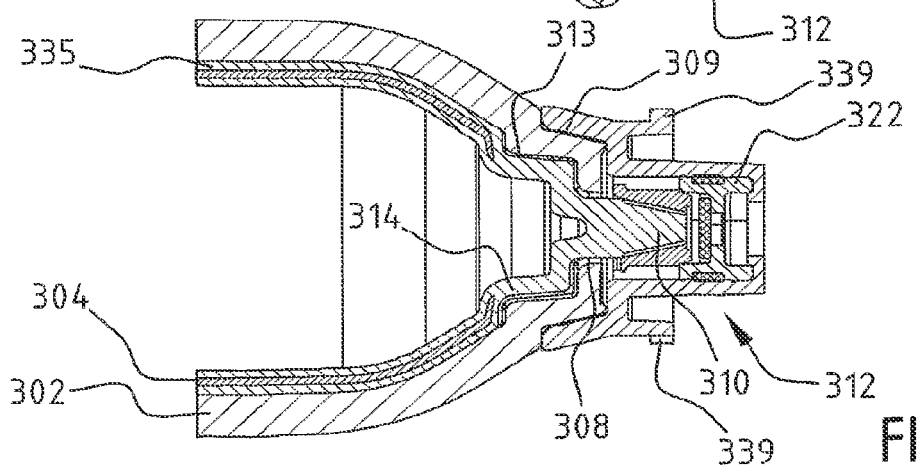
Figure 34:
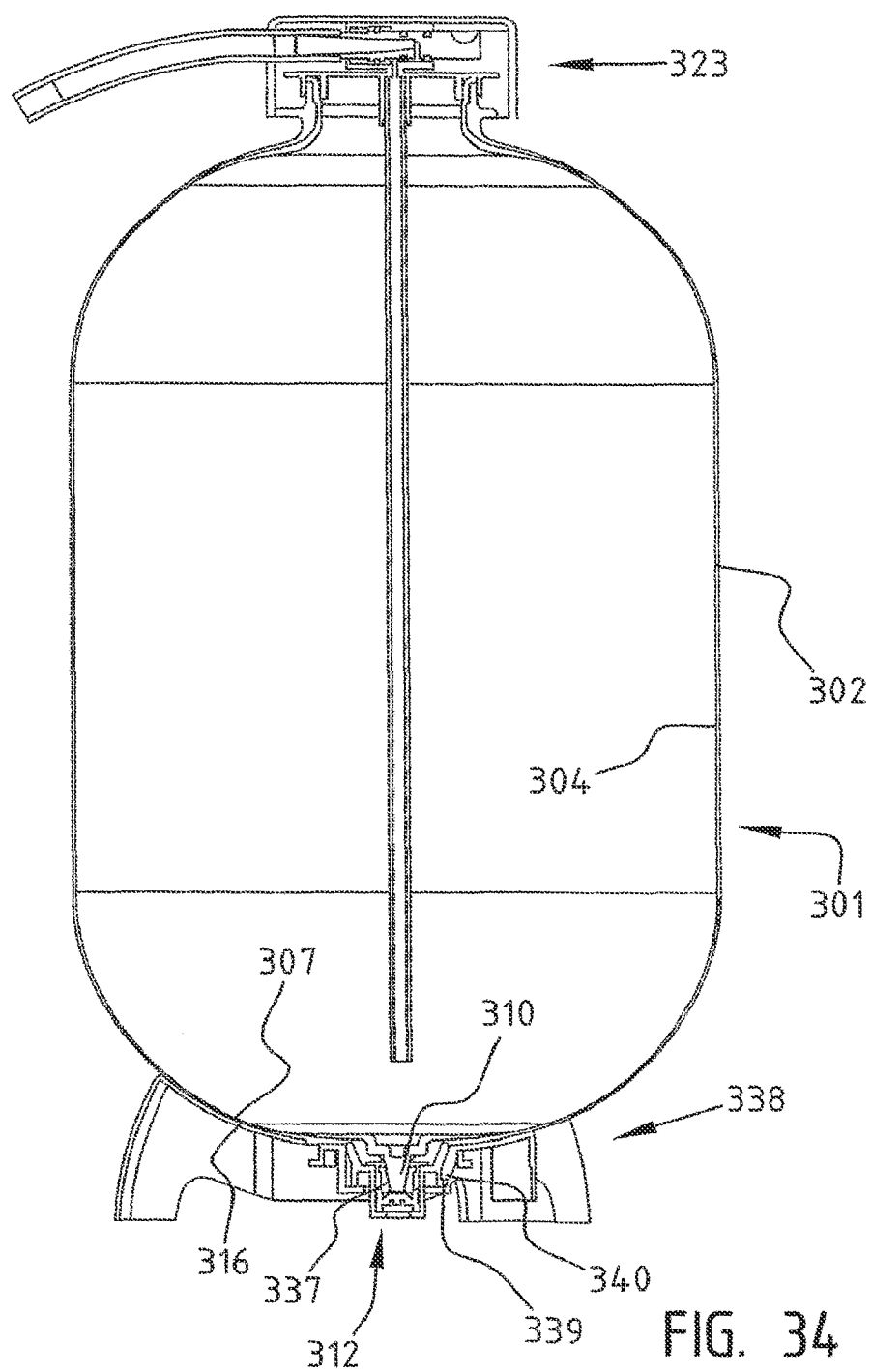

The invention is now elucidated on the basis of a number of examples, wherein references made to the accompanying drawing in which corresponding components are designated with reference numerals increased by '100' at a time, and in which:

FIG. 1 shows a section through a semi-manufacture of the container according to a first embodiment of the invention after two-component injection molding thereof, FIG. 2 shows a section through the container of FIG. 1 after it has been blown to its final form, FIG. 3 is a detail view of a bottom part of the container of FIG. 2 opposite the dispensing opening after space has been created between the inner container and the outer container by pressing the fixing element inward, FIGS. 4 and 5 are detail views showing how a connecting member is connected to the bottom part of the container, FIG. 6 is a detail view showing how a displacing medium, for instance air, can flow through the connecting member to the space between the inner container and the outer container, FIG. 7 to 10 show sections of the container with the connecting member and a dosing head on the dispensing opening during different stages of dispensing of a product from the container, FIG. 11 is a perspective view of an anti-collapse member which can be accommodated in the inner container, FIG. 12 shows a section through the container provided with the anti-collapse member of FIG. 11, FIG. 13 shows a section through the container of FIG. 12 in a plane perpendicularly of the plane of this figure, FIGS. 14 to 17 show views corresponding with FIGS. 7 to 10 of dispensing of a product from the container of FIGS. 12 and 13, FIGS. 18 and 19 show respectively a perspective view and a section of a semi-manufacture of an outer container according to an alternative embodiment of the invention, FIGS. 20 and 21 show views corresponding with FIGS. 18 and 19 of a separately formed semi-manufacture of an inner container, FIG. 22 shows a section through to semi-manufactures of intermediate layers already pushed partially into each other, FIG. 23 shows in cross-section how the semi-manufactures of the outer container, the intermediate layers and the inner container are pushed into each other, FIG. 24 is a section in which the different semi-manufactures are shown in assembled state, FIG. 25 shows a section through a semi-manufacture of an outer container, with a semi-manufacture of an inner container being shown in elevation, FIG. 26 shows a section through the semi-manufactures when they have been pushed together, FIG. 27 is a perspective detail view showing how a locking piece is welded onto the fixing element, FIG. 28 is a section through a bottom part of the semi-manufactures, FIG. 29 shows a view corresponding with FIG. 27 of arranging a connecting member around the opening, in which the connecting member is separately shown in section, FIG. 30 is a view corresponding with FIG. 28 and including the connecting member, FIG. 31 is a side view of the semi-manufactures in assembled state and including the connecting member, FIG. 32 is a side view of the container after it has been blown into its final shape, FIG. 33 shows in side view how the container is provided with a base and dosing head, and FIG. 34 shows a section through the container as it is ready for use.

A container 1 for a product for dispensing, for instance ice-cream, comprises a relatively stiff outer container 2 having a dispensing opening 3 (FIG. 2). In the shown example outer container 2 is manufactured from a hard plastic type such as PET. Container 1 further comprises a deformable inner container 4 which is accommodated in outer container 2 and in which the product is ultimately received. This inner container 4, which can be manufactured for instance from a plastic type such as PP, is likewise provided with a dispensing opening 5 and is connected in any case at the position of dispensing openings 3, 5 to outer container 2. In the shown example inner container 4 is formed integrally with outer container 2 so that it is connected over its whole surface, to outer container 2. Inner container 4 and outer container 2 are formed here by two-component injection moulding as a relatively thick-walled, substantially tubular semi-manufacture (FIG. 1) which is easy to handle, transport and store. This semi-manufacture is finally heated and blown into the final, relatively thin-walled form at the location where container 1 must be filled with the product.

According to a first aspect of the invention, inner container 4 is further connected to outer container 2 at a location 6 remote from dispensing openings 3, 5. In the shown example this is a mechanical connection, more particularly a snap or clamp connection, and the connecting location 6 lies diametrically opposite dispensing openings 3, 5 of the outer and inner containers 2, 4. At the position of connecting location 6 outer container 2 has in its end wall 7 an opening 8 which is formed in a protruding part 9 of end wall 7. This protruding part 9 is in fact the gate from the injection moulding. A fixing element 10 connected to inner container 4 protrudes through this opening 8. This fixing element 10 is here formed integrally with inner container 4, more particularly with a protruding part 14 thereof, and likewise forms the gate during injection moulding.

In the shown embodiment fixing element 10 is pin-like and the fixing is finally realized by bending or deforming an end part 11 thereof such that the dimensions of end part 11 become larger than the diameter of opening 8 (FIG. 6). In the shown example the outer container 2 is otherwise not connected directly to inner container 4 but is in fact enclosed between inner container 4 and a connecting member 12 to be described in detail hereinbelow.

Defined between inner container 4 and outer container 2 is a space 13 into which a displacing medium can be introduced to urge the product out of inner container 4 through dispensing opening 5 to the outside. In the shown example this space 13 is defined at the position of connecting location 6 and is brought into communication with the atmosphere via opening 8 in end wall 7 of outer container 2. For this purpose the fixing element 10 is pressed partially back again into outer container 2, whereby a part of inner container 4 connected to fixing element 10 is pulled free of outer container 2 and carried a distance (FIG. 3).

The connecting member 12 already mentioned above is then connected to outer container 2 at the position of opening 8. This connecting member 12 serves to bring space 13 into communication with a source (not shown here) of displacing medium, for instance a hand pump as described in the cited patent WO 2007/039167. As will be elucidated below, connecting member 12 is here connected to outer container 2 by means of fixing element 10.

In the shown example connecting member 12 takes the form of a ring with a flat base 15 and a bowl-shaped upper part 16, the form of which corresponds to the form of end wall 7 of outer container 2 (FIG. 4). This bowl-shaped upper part 16 is connected to outer container 2 by means of glueing. Further formed in connecting member 12 is a cylindrical receiving space 17, the form and dimensions of which correspond precisely to those of the protruding part 9 of end wall 7, so that this part 9 can be accommodated sealingly in space 17 (FIG. 5). Formed in the bottom of receiving space 17 is an opening 18, the diameter of which corresponds to that of end part 11 of fixing element 10. This end part 11 is thus placed sealingly through opening 18.

The pin-like fixing element 10 takes a stepped form and has three segments of differing diameter which are separated by two shoulders 19, 20. The upper segment has the same diameter as opening 8 in outer container 2, and closes this opening 8 following the injection moulding (FIG. 1, 2). The middle segment has a slightly smaller diameter so that, after fixing element 10 has been pressed inward, an annular passage is defined around the fixing element (FIG. 3). The diameter of the segment is greater than that of opening 18 in connecting member 12, so that shoulder 20 comes to lie as stop on the edge of this opening 18 (FIG. 5). When end part 11 is then heated and deformed, the bottom of receiving space 17 is enclosed between shoulder 20 and end part 11, whereby connecting member 12 is attached non-releasably to outer container 2 (FIG. 6).

Connecting member 12 otherwise has a connection 21 for a conduit leading to the source of displacing medium, and a valve 22 placed between this connection 21 and receiving space 17. This valve 22 allows passage of the displacing medium in only one direction toward space 13, and prevents escape of the medium.

Once connecting member 12 has been connected to outer container 2 and inner container 4 is filled with the product for dispensing, a dosing head 23 can be mounted on the neck around dispensing opening 3 of outer container 2. This dosing head 23 can for instance be of the type described in the cited patent WO 2007/039167, with a spherical cap with dosing opening 24 and a likewise spherical closure member 25 which is connected pivotally thereto and which can be operated by a handle 26. Container 1 is hereby then ready for use (FIG. 7).

Figure 8:
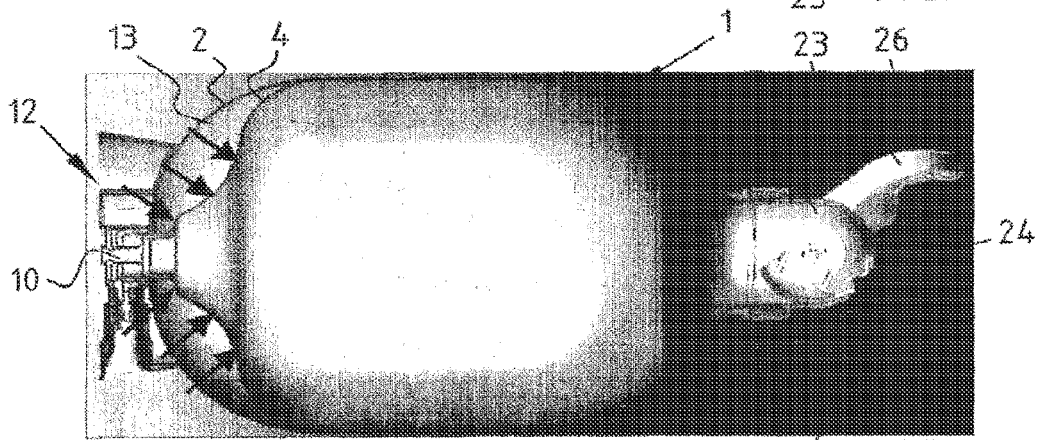
Figure 9:
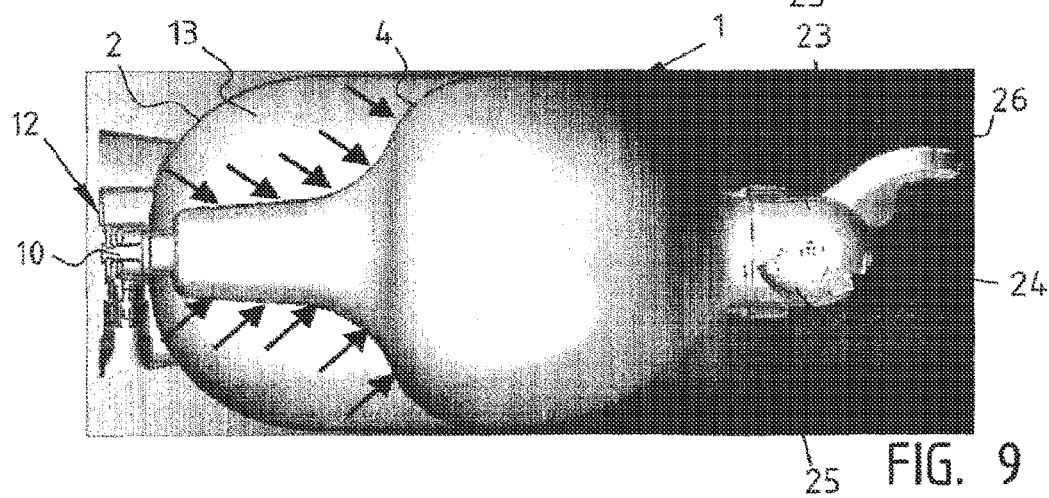
Figure 10:
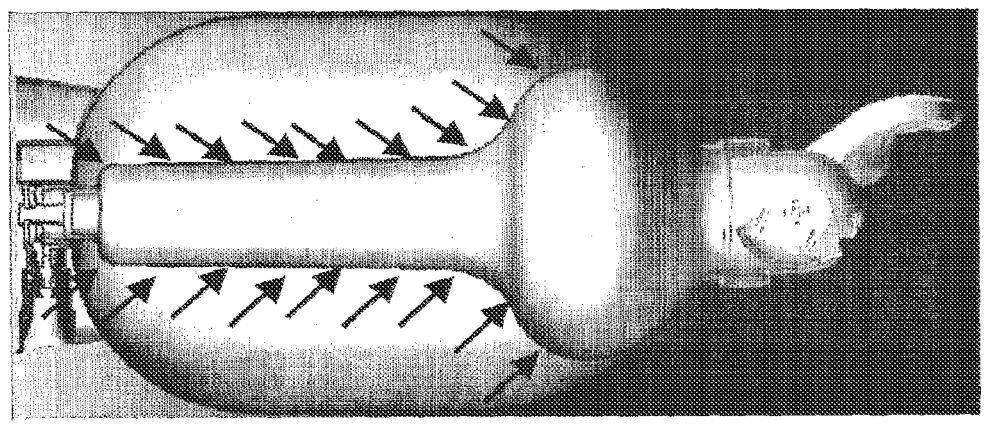

During use the space 13 between inner container 4 and outer container 2 is filled each time with displacing medium by operating the pump, whereby the product in inner container 4 is brought under pressure. Closure member 25 is then operated by moving handle 26, whereby the dosing opening 24 is left clear and the product flows therethrough out of container 1. Since inner container 4 is hermetically sealed from the atmosphere, the outflowing product is not replaced by outside air and so the inner container 4 as it were shrinks. An increasingly greater part of the outer surface of inner container 4 hereby detaches from the inner surface of outer container 2 (FIG. 8, 9, 10). However, because the rear side of inner container 4 is fixed mechanically to end wall 7 of outer container 2, the inner container remains to some extent stretched and tensioned, thereby avoiding as far as possible the formation of folds in which product could be enclosed. Practically the whole content of inner container 4 can thus be dispensed.

In an alternative embodiment of container 101 use is made, in addition to or instead of the fixing of the rear side of inner container 104 to end wall 107 of outer container 102, of an anti-collapse member 127 to prevent collapse or crumpling of inner container 104. In the shown example the anti-collapse member 127 is elongate and extends from dispensing opening 105 into inner container 104 (FIG. 12, 13). Because inner container 104 is here also connected mechanically on its rear side to outer container 102, it is possible to suffice with an anti-collapse member 127 which extends over only slightly more than half the distance between dispensing openings 103, 105 and end wall 107 in inner container 104. It is however also possible to envisage use being made of an anti-collapse member extending substantially as far as end wall 107. In that case it is not necessary to still fix the inner container 104 separately to outer container 102, since the anti-collapse member does then after all hold the rear side of inner container 104 fixedly at the position of end wall 107.

In this example the anti-collapse member 127 takes the form of a tube with a side wall in which a large number of openings 128 are formed. These openings 128 extend in each case over almost half the periphery of the tube and are offset in each case in longitudinal and in peripheral direction of anti-collapse member 127. This in fact creates a kind of ladder construction with two supports 129 having therebetween a number of semicircular rungs 130 protruding on either side (FIG. 11). Supports 129 are further connected at the top by a continuous ring 131 which is accommodated in dispensing opening 105 of inner container 104.

The operation of this embodiment, of container 101 is almost the same as that of the first embodiment. The product is dispensed from inner container 104 when the space 113 between inner container 104 and outer container 102 is filled with pressurized displacing medium and closure member 125 is operated. Anti-collapse member 127 then ensures—in the shown embodiment in combination with fixing element 110—that inner container 104 does not collapse or crumple, so that it can be emptied almost completely (FIG. 14-17). The maximum residual volume is equal to the volume of anti-collapse member 127. Owing to the relatively open configuration thereof, the anti-collapse member 127 does not obstruct the outflow of product. Nor will hardly any product adhere to this member 127 because the surface area of anti-collapse member 127 is further relatively small.

In yet another embodiment of container 201 the inner container 204 and outer container 202 are formed separately of each other and subsequently brought together and connected. Inner container 204 and outer container 202 are once again each formed here as relatively thick-walled, substantially tubular semi-manufactures (FIG. 18-21) and, after being connected, are blown to their final relatively thin-walled form. For the purpose of mutually connecting inner container 204 and outer container 202 at the position of dispensing openings 203, 205, the inner container is provided with a bent end edge 232 which can be snapped round a collar 233 of outer container 202.

Because outer container 202 is formed separately, for instance by injection moulding, it is possible to arrange the opening 208 therein later with a machining operation, instead of direct co-molding of this opening. Use can thus be made of a simpler mould.

Another advantage of separate forming of inner container 204 and outer container 202 is that the production process for each of these components can be optimized. The relatively longer cycle time for injection moulding of outer container 202, which is thicker than inner container 204, can thus be compensated by using for this purpose for instance a mould with a larger number of mould cavities. The parameters of the production processes can also be adapted optimally to the different materials used for outer container 202 and inner container 204.

When inner container 204 and, outer container 202 are formed separately, it is also relatively simple to arrange extra layers 235, 236 therebetween. These intermediate layers 235, 236 can likewise be formed by injection moulding and take a form corresponding to that of inner container 204 and outer container 202 (FIG. 22). In this case the intermediate layers 235, 236 are enclosed between inner container 204 and outer container 202 when these latter are pushed and snapped fixedly into each other (FIG. 23). It is however also possible to envisage one or more of the intermediate layers 235, 236 being formed by a film wrapped round inner container 204 before it is pushed and snapped fixedly into outer container 202.

Intermediate layers 235, 236 have a thickness roughly corresponding to or smaller than that of inner container 204, and are likewise readily deformable so that inner container 204 and intermediate layers 235, 236 do in fact behave as one whole. A multilayer inner container 204 is in fact thus formed (FIG. 24). The space between inner container 204 and outer container 202 which the displacing medium can enter is therefore defined in this embodiment between outer container 202 and outer intermediate layer 235.

Intermediate layers 235, 236 can serve to improve the barrier properties of container 201, so that the quality of the product received therein is guaranteed. Intermediate layers 235, 236 can also serve as reinforcement for inner container 204 or for the purpose of improving the chemical resistance. Whether the use of intermediate layers 235, 236 is necessary, and which materials must be used for this purpose depend on the nature of the product to be dispensed.

Intermediate layers 235, 236 can otherwise also be formed integrally with inner container 204 by means of co-injection or co-extrusion. Other possibilities of incorporating layers between inner container 204 and outer container 202 are so-called in-mould labelling, wherein a printed film is first placed in the injection mould before inner container 204 is injection moulded, or so-called sleeving, wherein a sleeve is arranged round inner container 204 after the injection moulding and subsequently drawn tightly therearound by crimping. In addition to improving the physical properties of inner container 204, in-mould labelling in particular has the result that an attractive container is obtained. Because outer container 202 will generally be transparent, or at least translucent, the appearance of inner container 204 is after all visible from the outside. An attractive optical effect can be achieved by in-mould labelling of inner container 204.

In yet another embodiment of the invention a multi-layer inner container 304 and an outer layer 302 are separately made of similar or identical plastics, for instance PET, and are then pushed together (FIG. 25). The inner container 304 is provided on its outside with a non-adhesive layer 335, for instance of silicon. This has for its result that during use the inner layer will easily separate from the outer layer when the displacing medium is introduced into the space 313 therebetween.

The inner container 304 is again provided with a protruding part 314, which forms the gate during injection moulding and which serves as fixing element 310. This protruding part 314 protrudes through the opening 308 in the base of the outer container 302 (FIG. 26). Contrary to the previous embodiments the protruding part 314 is not deformed or bent, but instead a locking piece 337 is fixed thereon. In the illustrated embodiment this locking piece 337 is also made of a similar or identical plastic as the inner container 304 and is welded thereon. In the illustrated embodiment a spin welding operation is performed to this end, in which the locking piece 337 is rotated at high speed and pressed against the protruding part 314, and is welded by the frictional heat (FIG. 27). However, other forms of welding or other modes of connection, like glueing, are of course conceivable.

A connecting member 312 is further attached to the outer container 302 to allow displacing medium to be introduced into the space 313 between the inner container 304 and the outer container 302. In this embodiment the space 313 is formed in that near its end part 314 the inner container 304 is made somewhat narrower and shorter than the outer container 302, with a rib 341 on the end part 314 providing proper positioning. In the illustrated embodiment the connecting member 312 is also made of a similar or identical plastic as the outer container 302 and is again attached to the protruding part 309 of the end wall 307 by spin welding. Before the connecting member 312 is attached to the outer container 302 a valve 322 is arranged therein (FIG. 29).

After the locking piece 337 and the connecting member 312 have been attached to the inner container 304 and the outer container 302 (FIG. 31), the semi-manufactures are blown into their final shapes (FIG. 32). Then a dosing head 323 can be attached to the neck surrounding the dispensing opening 303, while a base 338 having a bowl-shaped upper part 316 can be mounted on the end wall 307 of the container 301 (FIG. 33). This base is provided with a receiving space 317 in which the connecting member 312 may be accommodated. The connecting member 312 and the base 338 are provided with cooperating lugs 339 and openings 340 (FIG. 34), which form a bayonet coupling.

Although the invention has been elucidated above on the basis of a number of embodiments, it will be apparent that the invention is not limited thereto. Another location could be chosen where the inner container is connected to the outer container. Moreover, the shape and dimensions of the fixing element, both in longitudinal and in cross-sectional direction could be selected differently, while also a plurality of fixing elements could be used. The form of the outer container and the inner container and the materials used can of course also be varied. The displacing medium could further also be introduced into the container at a location other than at the connecting location. Also, the use of a valve is not required if the source of displacing medium is constantly pressurized.

The scope of the invention is therefore defined solely by the following claims.

The invention claimed is:

1. Container for a product for dispensing, comprising:
   a relatively stiff outer container having at least one first dispensing opening, and
   a deformable inner container to be filled with a product which is accommodated in the outer container, said inner container having a second dispensing opening and being connected to the outer container (i) in the vicinity of the first dispensing opening and (ii) at another location on the outer container remote from the first dispensing opening,
   wherein the outer container is a one piece integrally molded container, and has at the position of the remote connecting location a remote connecting opening through which protrudes at least one fixing element connected to the inner container, said fixing element being pin-like and having an end part of which the dimensions are larger than those of the remote connecting opening,
   wherein a space for a displacing medium is defined between the inner container and the outer container, and at least one of:
   the space is defined at the position of the remote connecting location and
   communicates with the atmosphere via the remote connecting opening;
   or
   the space is defined at the position of the remote connecting location and
   communicates with the atmosphere via the remote connecting opening, said space bounded by a part of the inner container which is held at a distance from the outer container by the fixing element.

2. Container as claimed in claim 1, wherein at least one of:
   the end part comprises a deformed or bent part of the fixing element;
   the end part comprises a locking piece attached to the fixing element;
   the fixing element is formed integrally with the inner container;
   and an elongate member which extends into the inner container from the second dispensing opening and which prevents collapse of the inner container.

3. Container as claimed in claim 1, wherein the remote connecting location lies substantially diametrically opposite the first dispensing opening.

4. Container as claimed in claim 1, wherein a non-adhesive layer is arranged between the inner container and the outer container.

5. Container as claimed in claim 1, wherein a connecting member for a source of displacing medium is connected to the outer container at the position of the remote connecting opening.

6. Container as claimed in claim 5, wherein the connecting member is connected to the outer container by means of the fixing element.

7. Container as claimed in claim 1, further comprising a product provided in the inner container.

8. The method of claim 1, wherein the inner container is connected to the outer container at one or more additional locations on the outer container.

9. The method of claim 8, wherein at least one of said additional locations also has at least one of:
   a connecting opening through which protrudes a fixing element,
   or
   a connecting opening through which the space for a displacing medium communicates with the atmosphere.

10. Method for manufacturing a container for a product for dispensing, comprising:
   forming a relatively stiff outer container having at least one first dispensing opening, the outer container being a one piece integrally molded container, and
   forming a deformable inner container to be filled with the product having a second dispensing opening,
   arranging the inner container in the outer container, and
   connecting the inner container to the outer container (i) in the vicinity of
   the first dispensing opening and (ii) at another location on the outer container remote from the first dispensing opening,
   wherein the outer container is provided at the position of the remote connecting location with a remote connecting opening through which is placed at least one pin-like fixing element connected to the inner container,
   and after being placed through the remote connecting opening the fixing element is provided with an end part enlarged such that the dimensions thereof are larger than those of the remote connecting opening.

11. Method as claimed in claim 10, wherein a free end of the fixing element is one of deformed or bent to constitute the enlarged end part.

12. Method as claimed in claim 10, wherein a locking piece is attached to the fixing element to constitute the enlarged end part.

13. Method as claimed in claim 10, wherein at least one of:
   the inner container is connected to the outer container at a location lying substantially diametrically opposite the first dispensing opening;
   the inner container is formed in the outer container; and
   the inner container is formed separately of the outer container and subsequently arranged in the outer container and connected thereto.

14. Method as claimed in claim 10,
   wherein at least one of:
   the inner container and the outer container are formed by one of injection molding or co-injection molding;
   the inner container and the outer container are formed by one of extrusion or co-extrusion;
   and
   that at least one of the inner container or the outer container is formed from multiple layers.

15. Method as claimed in claim 10, wherein a non-adhesive layer is arranged between the inner container and the outer container.

16. Method as claimed in claim 10, wherein an elongate member is inserted into the inner container from the second dispensing opening in order to prevent the collapse of the inner container.

17. Method as claimed in claim 10, further comprising providing a product in the inner container.

18. The method of claim 10, wherein the inner container is connected to the outer container at one or more additional locations on the outer container.

19. The method of claim 18, wherein at least one of said additional locations also has at least one of:
   a connecting opening through which protrudes a fixing element,
   or
   a connecting opening through which the space for a displacing medium communicates with the atmosphere.

* * * * *